US010789643B1

(12) United States Patent
Chang et al.

(10) Patent No.: US 10,789,643 B1
(45) Date of Patent: Sep. 29, 2020

(54) ACCOUNTANT ACCOUNT TAKEOVER FRAUD DETECTION

(71) Applicants: Eva Diane Chang, Mountain View, CA (US); Bei Huang, Mountain View, CA (US)

(72) Inventors: Eva Diane Chang, Mountain View, CA (US); Bei Huang, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 198 days.

(21) Appl. No.: 15/798,124

(22) Filed: Oct. 30, 2017

(51) Int. Cl.
*G06Q 40/02* (2012.01)
*H04L 29/08* (2006.01)
(Continued)

(52) U.S. Cl.
CPC ........... *G06Q 40/025* (2013.01); *G06F 17/18* (2013.01); *G06K 9/6218* (2013.01);
(Continued)

(58) Field of Classification Search
CPC ...... G06Q 40/00; G06Q 20/40; G06Q 40/025; G06Q 40/02; G06Q 20/4016; G06Q 20/10; G06Q 30/0201; G06Q 30/02; G06Q 30/0215; G06Q 40/12; G06Q 10/10; G06Q 20/102; G06Q 20/20; G06Q 20/387; G06Q 20/401; G06Q 30/00; G06Q 30/0204; G06Q 10/0635; G06Q 10/087; G06Q 20/108; G06Q 20/32; G06Q 20/3223; G06Q 20/3224; G06Q 20/3274; G06Q 20/382; G06Q 20/3825; G06Q 20/405; G06Q 30/0207; G06Q 30/0212; G06Q 30/0255; G06Q 30/0601; G06Q 40/04; G06Q 40/10; G06Q 40/128; G06Q 50/265; H04M 15/44; H04M 15/58; H04M 15/745; H04M 15/80; H04M 15/8011; H04M 15/8044; H04M 15/805; H04M 15/8083; H04M 15/83; H04M 15/85; H04M 15/851;
(Continued)

(56) References Cited

U.S. PATENT DOCUMENTS 9,111,278 B1 * 8/2015 Barton ................... G06Q 20/20
2004/0205030 A1 * 10/2004 Fox ......................... G06Q 10/10
705/78

(Continued)

*Primary Examiner* — Alexander G Kalinowski
*Assistant Examiner* — Sanjeev Malhotra
(74) *Attorney, Agent, or Firm* — Ferguson Braswell Fraser Kubasta PC

(57) ABSTRACT

A method for fraud detection may include receiving, via a first user account of a business management application (BMA), a first loan application for a first business entity. The first user account may be accessible to an accountant of an accounting firm. The method may further include receiving, via a second user account of the BMA, a second loan application for a second business entity. The second user account may be accessible to the accountant. The method may further include determining, using a cluster analysis, (i) a connection strength between the first business entity and the second business entity relative to the accounting firm, and (ii) a fraud score for the accounting firm, and determining, based on the connection strength and the fraud score, a probability that the first loan application is fraudulent.

19 Claims, 7 Drawing Sheets

(51) Int. Cl.
*G06K 9/62* (2006.01)
*G06F 17/18* (2006.01)
*H04W 12/12* (2009.01)

(52) U.S. Cl.
CPC ............ *G06K 9/6267* (2013.01); *H04L 67/22* (2013.01); *H04L 67/306* (2013.01); *H04W 12/12* (2013.01)

(58) Field of Classification Search
CPC . H04M 2215/0104; H04M 2215/0108; H04M 2215/018; H04M 2215/0184; H04M 2215/0188; H04M 2215/74; H04M 2215/7407; H04M 2215/745; H04M 2215/7457; H04M 2215/81; H04M 2215/8129; H04M 2215/815; H04M 15/00; H04L 63/08; H04L 2463/082; H04L 63/0861; H04L 63/0876; H04L 63/102; H04L 63/1408; H04L 63/18; G06F 16/258; G06F 21/31; G06F 21/6218
USPC ........ 705/4, 7.15, 7.33, 14.17, 14.53, 14.66, 705/30, 35, 38, 39, 44, 78
See application file for complete search history.

(56) References Cited

U.S. PATENT DOCUMENTS

| | | | | |
|---|---|---|---|---|
| 2005/0125337 A1* | 6/2005 | Tidwell | ............... | G06Q 40/02 705/39 |
| 2005/0222928 A1* | 10/2005 | Steier | ............... | G06Q 40/00 705/35 |
| 2005/0222929 A1* | 10/2005 | Steier | ............... | G06Q 40/00 705/35 |
| 2005/0273368 A1* | 12/2005 | Hutten | ............... | G06Q 40/08 705/4 |
| 2006/0212487 A1* | 9/2006 | Kennis | ............... | G06Q 10/10 |
| 2008/0082376 A1* | 4/2008 | Kennis | ............... | G06F 16/258 705/7.15 |
| 2009/0099959 A1* | 4/2009 | Liao | ............... | G06Q 40/00 705/38 |
| 2009/0112649 A1* | 4/2009 | Wernikoff | ............... | G06Q 40/00 705/35 |
| 2009/0112767 A1* | 4/2009 | Hammad | ............... | H04L 63/18 705/44 |
| 2010/0042454 A1* | 2/2010 | Liao | ............... | G06Q 20/108 705/35 |
| 2010/0325035 A1* | 12/2010 | Hilgers | ............... | G06Q 40/025 705/38 |
| 2011/0307382 A1* | 12/2011 | Siegel | ............... | G06Q 20/4016 705/44 |
| 2012/0179598 A1* | 7/2012 | Roth | ............... | G06Q 40/025 705/38 |
| 2012/0310831 A1* | 12/2012 | Harris | ............... | G06Q 30/02 705/44 |
| 2012/0317015 A1* | 12/2012 | Cohen | ............... | G06Q 40/025 705/38 |
| 2013/0325608 A1* | 12/2013 | Kulkarni | ............... | H04M 15/58 705/14.53 |
| 2013/0325680 A1* | 12/2013 | Satyavolu | ............... | H04M 15/8044 705/35 |
| 2013/0325681 A1* | 12/2013 | Somashekar | ............... | H04M 15/8011 705/35 |
| 2014/0180783 A1* | 6/2014 | Satyavolu | ............... | H04M 15/44 705/14.17 |
| 2014/0324677 A1* | 10/2014 | Walraven | ............... | G06Q 20/4016 705/39 |
| 2015/0106260 A1* | 4/2015 | Andrews | ............... | G06Q 20/4016 705/39 |
| 2015/0170175 A1* | 6/2015 | Zhang | ............... | H04M 15/44 705/7.33 |
| 2015/0220951 A1* | 8/2015 | Kurapati | ............... | H04M 15/83 705/7.33 |
| 2015/0220999 A1* | 8/2015 | Thornton | ............... | H04M 15/8011 705/14.66 |
| 2016/0086263 A1* | 3/2016 | Weinflash | ............... | G06Q 40/025 705/38 |
| 2016/0196615 A1* | 7/2016 | Yen | ............... | G06Q 20/401 705/30 |
| 2016/0307191 A1* | 10/2016 | Turgeman | ............... | G06Q 20/382 |
| 2016/0335653 A1* | 11/2016 | Bodington | ............... | G06Q 30/02 |
| 2017/0118207 A1* | 4/2017 | Madhu | ............... | G06Q 40/02 |
| 2018/0033006 A1* | 2/2018 | Goldman | ............... | H04L 63/1408 |
| 2018/0033009 A1* | 2/2018 | Goldman | ............... | G06Q 40/10 |
| 2018/0075527 A1* | 3/2018 | Nagla | ............... | G06F 21/6218 |
| 2018/0109507 A1* | 4/2018 | Caldera | ............... | H04L 63/08 |
| 2018/0316665 A1* | 11/2018 | Caldera | ............... | H04L 63/104 |
| 2019/0080320 A1* | 3/2019 | Hammad | ............... | G06Q 10/087 |
| 2019/0122149 A1* | 4/2019 | Caldera | ............... | G06Q 10/0635 |

\* cited by examiner

ACCOUNTANT ACCOUNT TAKEOVER FRAUD DETECTION

BACKGROUND

A business entity that uses a business management application (BMA) may invite an accountant to access the business entity's business data via the BMA. The accountant and/or the accounting firm the accountant represents, may have access to the user accounts of multiple business entities that are users/customers of the BMA. However, if the accountant falls victim to an account takeover (or the accountant is corrupt), the credentials of a BMA account of the accountant or the entire accounting firm may be accessible to a fraudster (or the corrupt accountant), who then accesses the accounts of several business entities accessible via the BMA. The fraudster (or the corrupt accountant) then is able to apply for fraudulent loans (or other types of credit or investment) or engage in other villainous activities using the identity and data of one or more of these business entities. As a result, the impact of a single accountant account takeover may be more extensive than the impact of the takeover of a single BMA customer account. In fact, the single accountant account takeover may result in access to the identity and data of several BMA customer accounts (possibly each and every BMA customer accounts accessible by an accounting firm), resulting in many fraudulent loan applications (or other more villainous activities perpetrated by the fraudster or corrupt accountant).

Standard methods for safeguarding access to accounts include multi-factor authentication (MFA) with a short message service (SMS) option or other types of MFA. However, these techniques do not specifically address the scenario of multiple fraudulent activities (such as loan applications) submitted as a result of an accountant account takeover where the appearance, at least initially, is the legitimate and authorized use of the account. More particularized schemes for such fraudulent activities are needed to avoid the financial losses from fraudulent loans and loss of confidence in the security practices of allowing accountants and accounting firms to directly access business entity data via one or more BMA accounts.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for fraud detection including receiving, via a first user account of a business management application (BMA), a first loan application for a first business entity. The first user account is accessible to an accountant of an accounting firm. The method further includes receiving, via a second user account of the BMA, a second loan application for a second business entity. The second user account is accessible to the accountant. The method further includes determining, using a cluster analysis, (i) a connection strength between the first business entity and the second business entity relative to the accounting firm, and (ii) a fraud score for the accounting firm, and determining, based on the connection strength and the fraud score, a probability that the first loan application is fraudulent.

In general, in one aspect, one or more embodiments relate to a system including a computer processor, a repository configured to store a first loan application and a second loan application, a business management application (BMA) executing on the computer processor including user accounts, and a fraud detector executing on the computer processor including a cluster generator configured to receive, via a first user account, the first loan application for a first business entity. The first user account is accessible to an accountant of an accounting firm. The method further includes receiving, via a second user account, the second loan application for a second business entity. The second user account is accessible to the accountant. The cluster generator is further configured to determine, using a cluster analysis, (i) a connection strength between the first business entity and the second business entity relative to the accounting firm, and (ii) a fraud score for the accounting firm, and determine, based on the connection strength and the fraud score, a probability that the first loan application is fraudulent.

In general, in one aspect, one or more embodiments of the invention relate to a non-transitory computer readable medium including instructions that, when executed by a computer processor, perform a method for fraud detection including receiving, via a first user account of a business management application (BMA), a first loan application for a first business entity. The first user account is accessible to an accountant of an accounting firm. The method further includes receiving, via a second user account of the BMA, a second loan application for a second business entity. The second user account is accessible to the accountant. The method further includes determining, using a cluster analysis, (i) a connection strength between the first business entity and the second business entity relative to the accounting firm, and (ii) a fraud score for the accounting firm, and determining, based on the connection strength and the fraud score, a probability that the first loan application is fraudulent.

Other aspects of the invention will be apparent from the following description and the appended claims.

DETAILED DESCRIPTION

Figure 1A:
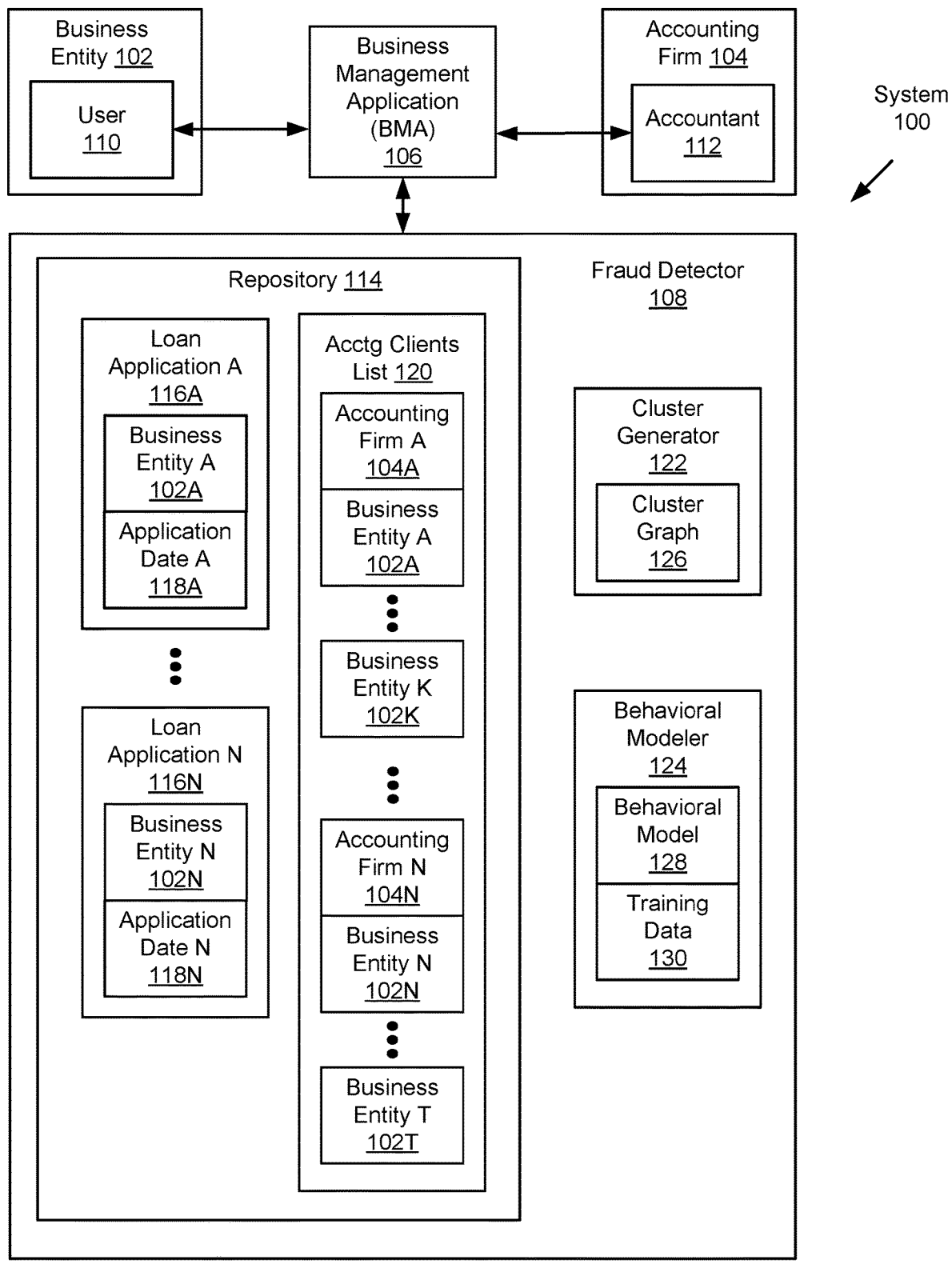
FIG. 1A and FIG. 1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention are directed to a system, method, and non-transitory computer readable medium for detecting fraudulent loan applications received via user accounts of a business management application (BMA), where the user accounts are accessible to an accountant. For example, an accountant may have access to the BMA user accounts of business entities for whom the accountant provides services. In one or more embodiments, a cluster analysis is used to determine the strength of connections between various business entities sharing a common accounting firm, and a fraud score that represents the fraud risk associated with the accounting firm. A probability that a loan application is fraudulent may be determined based on the connection strength and the fraud score.

In one or more embodiments, a behavioral model is applied to the behavior of the accountant with access to the BMA user accounts to determine a fraud score associated with the accountant. The behavioral model may be based on spending behavior and the BMA usage behavior. The fraud score associated with the accountant may also be a factor in determining the probability that a loan application is fraudulent. Additional factors in determining the probability that a loan application is fraudulent may include: receiving multiple recent loan applications for business entities whose BMA user accounts are accessible to the same accountant, and recent changes to a linked account (e.g., bank account) of the BMA user account associated with the loan application.

FIG. 1A shows a system (100) in accordance with one or more embodiments of the invention. As shown in FIG. 1A, the system (100) includes a business entity (102), an accounting firm (104), a business management application (BMA) (106), and a fraud detector (108). A business entity (102) may be any organization (e.g., a corporation) that provides products and/or services to other business entities (102) and/or individuals. An accounting firm (104) may be any organization (e.g., a business entity (102)) that provides accounting products and/or services to business entities (102) and/or individuals.

The BMA (106) may be an accounting application, a tax preparation application, a payroll application, a personnel application, any combination thereof, or any other application for managing an aspect of a business or organization. The BMA (106) may be implemented in hardware (e.g., circuitry), software, or any combination thereof. In one or more embodiments, the BMA (106) is accessible over a computer network (e.g., the network (520) described with respect to FIG. 5B).

In one or more embodiments, a business entity (102) includes one or more users (110). A user (110) may be any individual in the business entity (102) using the BMA (106). The user (110) may be a business owner, an employee, or other person associated with the business entity (102) using the BMA (106) to manage business activities of the business entity (102). For example, the business activities may include accounting activities, personnel activities, payroll activities, etc.

In one or more embodiments, the BMA (106) is provided by an application service provider, such as a software as a service (SaaS) provider. For example, the BMA (106) may be a SaaS accessed by the user (110) on a subscription basis. In one or more embodiments, the BMA (106) requires a user registration procedure to obtain user specific information (e.g., security credentials) used to access the BMA (106).

An accountant (112) may be an individual in the accounting firm (104) using the BMA (106). In one or more embodiments, the accountant (112) may be granted access to a user account (e.g., user account (150N) of FIG. 1B) of the BMA (106) corresponding to a business entity (102) that is a customer of the BMA (106). In one or more embodiments, the business entity (102) may hire the accountant (112) to manage, maintain and/or update various accounting-related information about the business entity (102) stored in the BMA (106). For example, the accountant (112) may have access to various resources (e.g., data, programs) of the BMA (106) (e.g., a ledger, invoices, and/or checks of the BMA (106)) relating to a user account of the BMA (106) corresponding to the business entity (102) that hired the accountant (112).

Continuing with FIG. 1A, the fraud detector (108) includes a repository (114), a cluster generator (122), and a behavioral modeler (124). The fraud detector (108) may be implemented in hardware (e.g., circuitry), software, or any combination thereof.

The repository (114) may be any type of storage unit and/or device (e.g., a file system, database, collection of tables, or any other storage mechanism) for storing data. Further, the repository (114) may include multiple different storage units and/or devices. The multiple different storage units and/or devices may or may not be of the same type or located at the same physical site.

The repository (114) may include loan applications (116A, 116N) and an accounting clients list (120). A loan application (116N) may be submitted by a business entity (102N) to a lender on an application date (118N). In one or more embodiments, a loan application (116N) includes information about the business entity (102N) on which a lender bases a decision to lend. For example, a loan application (116N) may include the following: business entity (102N), application date (118N), name(s) of principal(s), loan application status (e.g., approved, pending, suspended, canceled, declined, suspected of fraud), etc. In one or more embodiments, the accounting clients list (120) indicates the business entities (e.g., (102A, 102K), (102N, 102T)) that are clients of various accounting firms (104A, 104N).

Figure 1B:
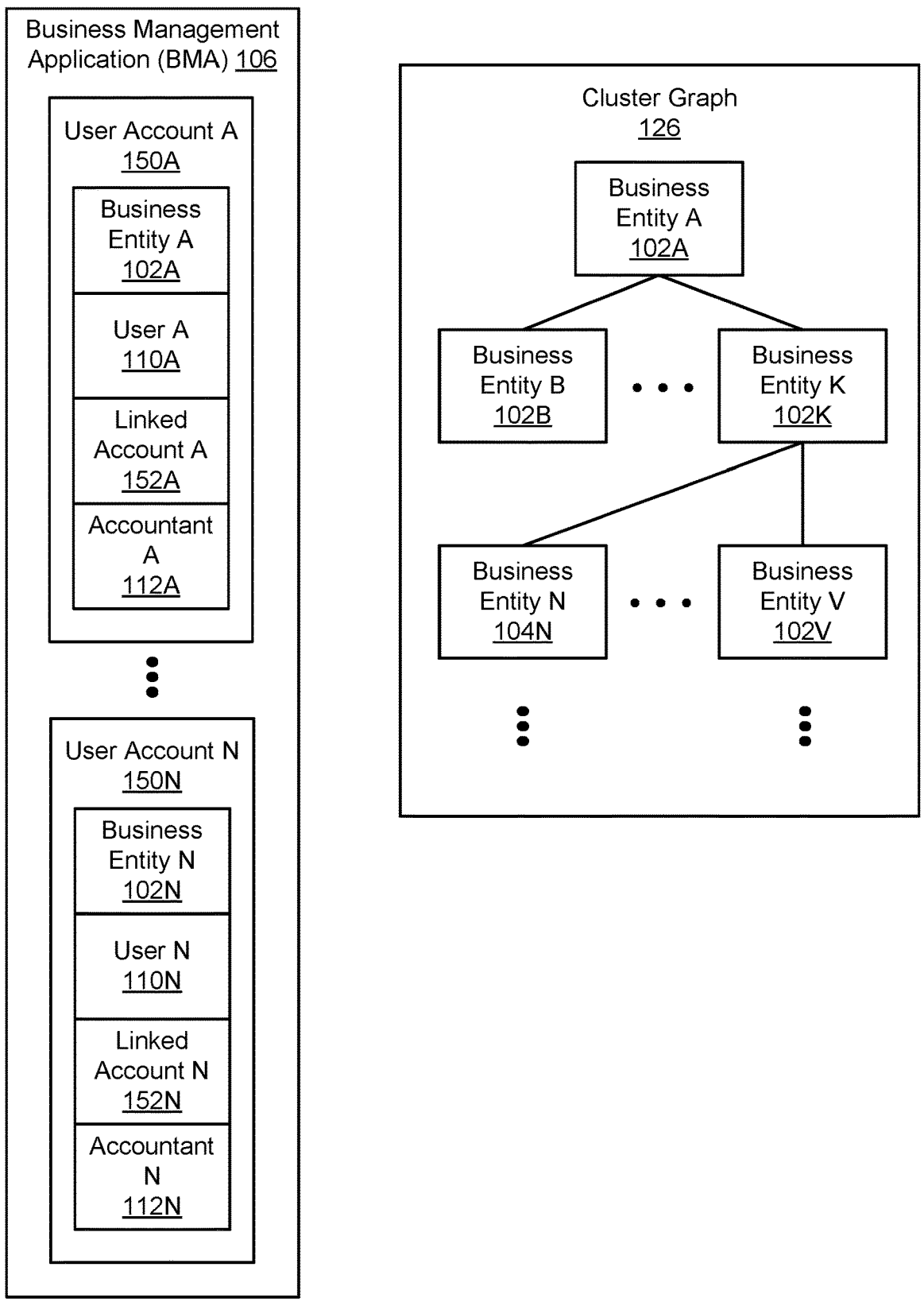

In one or more embodiments, the cluster generator (122) includes functionality to generate a cluster graph (126). In one or more embodiments, the cluster generator (122) may use a variety of techniques (e.g., k-means clustering, naïve Bayes, unsupervised machine learning techniques, including using a scikit-learn library, etc.) to generate the cluster graph (126). As shown in FIG. 1B, the cluster graph (126) may include nodes corresponding to business entities (102A, 102V). Each edge of the cluster graph (126) may represent a connection strength between a pair of business entities (102A, 102V). The connection strength may be a measure of the similarity between the business entities (102A, 102V) relative to one or more attributes. For example, an attribute may be one of the following: owner, accountant (112A), accounting firm (104A), linked account (152N) (described below), location (e.g., the same city), identifying number (e.g., employer identification number (EIN)), phone number, IP address, etc. The connection strength may depend on the type of the attribute(s). For example, the connection strength may be strong when the business entities (102A, 102V) share the same owner, while the connection strength may be weak when the business entities (102A, 102V) share the same city. In addition, the connection strength may be strong when the business entities (102A, 102V) share more than one attribute.

Returning to FIG. 1A, in one or more embodiments, the cluster generator (122) includes functionality to assign a fraud score for a business entity (102N) (e.g., an accounting firm (104N)). The fraud score for a first business entity (102N) may be a measure of the similarity between the business entity (102N) and a second business entity that is known to be associated with fraudulent behavior. In one or more embodiments, the cluster generator (122) includes functionality to assign a probability that a loan application (116N) is fraudulent (e.g., based on a fraud score assigned to a business entity (102N) associated with the loan application (116N)).

The behavioral modeler (124) may include functionality to generate a behavioral model (128) based on training data (130). The behavioral model (128) may be used to adaptively discriminate between behavior that is indicative of fraud and behavior that is innocent. In one or more embodiments, the behavioral modeler (124) uses a variety of techniques (e.g., random forests, logistic regression, density-based scans, naïve Bayes, unsupervised machine learning techniques, using a scikit-learn library, etc.) to generate the behavioral model (128).

In one or more embodiments, the behavioral model (128) includes representations of behavior relating to a lifestyle of an individual (e.g., an accountant (112A)). For example, spending behavior may be based on transactions obtained from a user account of the accountant (112A) in the BMA (106), merged (e.g., joined) with transactions obtained from a personal financial management application (e.g., Mint®) of the accountant (112A) (Mint is a trademark of Intuit, Inc., Mountain View, Calif.).

The behavioral model (128) may be trained using training data (130) of the individual's peers. In one or more embodiments, the training data (130) may include data on the spending behavior of accountants (e.g., including known fraudulent accountants and known innocent accountants). For example, the spending behavior may be based on financial transactions (e.g., corresponding to purchases) associated with accountants obtained from the BMA (106) and/or third party data sources. Training data (130) for other aspects of accountant behavior may be obtained from a variety of data sources (e.g., social media sites where individuals post regarding their activities, such as vacations).

In one or more embodiments, the behavioral model (128) includes representations of behavior relating to usage of the BMA (106). The representations of usage behavior may be based on clickstream data and/or accounting-related data. In one or more embodiments, the behavioral model (128) is trained using training data (130) (e.g., product usage data and/or clickstream data) labeled as fraudulent by human observers. For example, a behavioral model (128) of usage behavior may be based some or all of the following data regarding one or more user accounts of the BMA (106) (e.g., user accounts (150A, 150N) of FIG. 1B) to which an accountant has access:

a. total activity in the user account (e.g., including any access or modification to data of the user account, such as changing receivables, payables, or transactions)

b. timing and/or frequency of issuing voided checks c. changed preferences of the user account d. deleting a user account Returning to FIG. 1B, the BMA (106) includes user accounts (150A, 150N). A user account (150N) may include permissions that provide access to resources (e.g., ledger, invoices, checks and/or transactions) of the BMA (106). A user account (150N) may indicate the business entity (102N) that owns the user account (150N) and a user (110N) with access to the user account (150N). For example, the user (110N) may be the owner or any employee of the business entity (102N). The user account (150N) may indicate an accountant (112N) with access to the user account (150N). For example, the accountant (112N) may perform various accounting tasks on behalf of the business entity (102N). In one or more embodiments, the user account (150N) indicates an accounting firm (104N) with access to the user account (150N) (e.g., such that any accountant (112N) of the accounting firm (104N) may access the user account (150N)). Each user account (150N) may indicate a linked account (152N) from which funds may be withdrawn and/or to which funds may be deposited. For example, the linked account (152N) may be a bank account or a credit card account of the business entity (102N).

While FIG. 1A and FIG. 1B show configurations of components, other configurations may be used without departing from the scope of the invention. For example, various components may be combined to create a single component. As another example, the functionality performed by a single component may be performed by two or more components.

Figure 2:
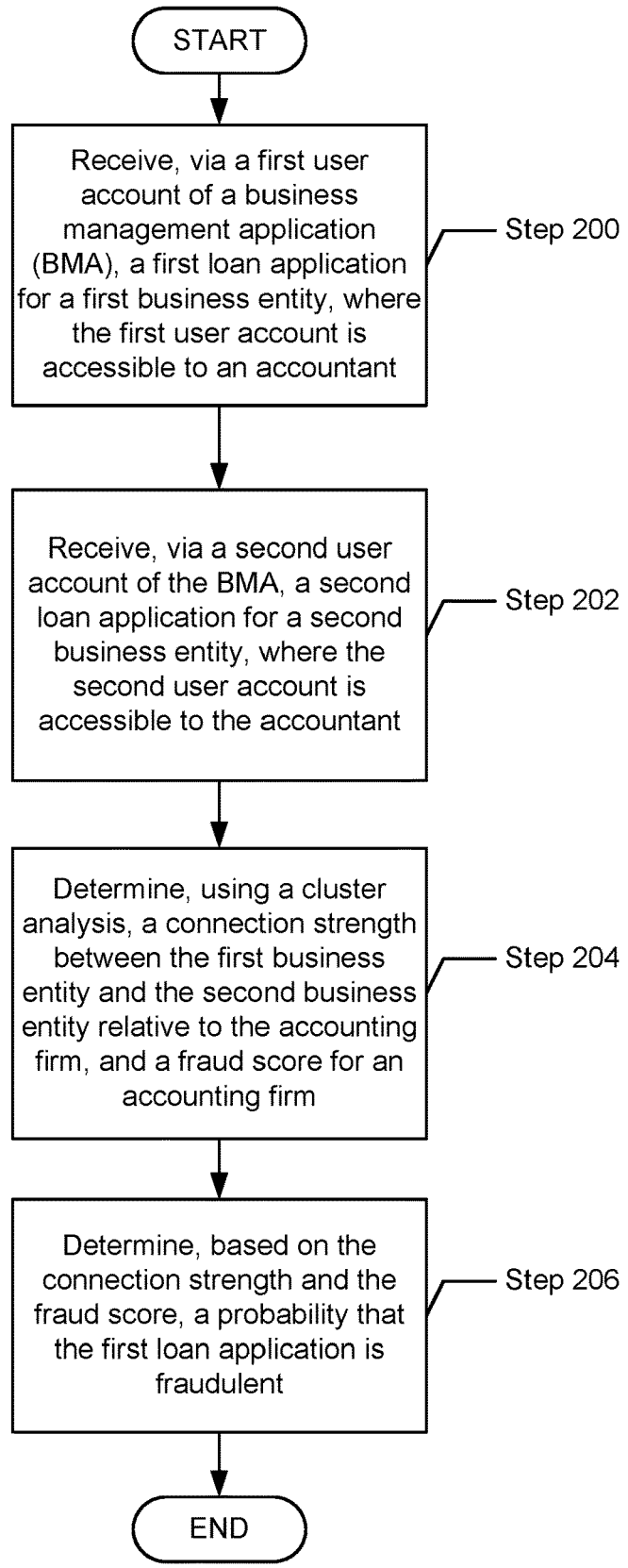
FIG. 2 and FIG. 3 show flowcharts in accordance with one or more embodiments of the invention.

FIG. 2 shows a flowchart in accordance with one or more embodiments of the invention. The flowchart depicts a process for fraud detection. One or more of the steps in FIG. 2 may be performed by the components (e.g., the cluster generator (122) and/or the behavioral modeler (124) of the fraud detector (108)) of the computer system (100), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a first loan application for a first business entity is received, via a first user account of a business management application (BMA). In one or more embodiments, the first loan application includes the following: business entity, application date, name(s) of principal (s), loan application status, etc. The first user account may include permissions that provide access to resources (e.g., ledger, invoices, checks) of the BMA. The first user account may indicate the first business entity that owns the first user account and an accountant with access to the first user account (e.g., the accountant may perform various accounting tasks on behalf of the first business entity). The accountant may be employed by an accounting firm that provides accounting products and/or services to the first business entity.

In Step 202, a second loan application for a second business entity is received, via a second user account of the BMA (see description of Step 200 above). In one or more embodiments, the second user account indicates that the accountant has access to the second user account.

In Step 204, a connection strength between the first business entity and the second business entity relative to the accounting firm is determined, using a cluster analysis. The cluster generator may use a variety of techniques (e.g., k-means clustering, unsupervised learning, etc.) to generate a cluster graph that represents the connection strength between the first business entity and the second business entity. The connection strength may be a measure of the similarity between the first business entity and the second business entity relative to the "accounting firm" attribute (e.g., where the attribute is the name or EIN of the accounting firm). For example, if the first business entity and the second business entity share the same accounting firm, then the connection strength may be "strong". The accounting clients list may be referenced to determine whether a business entity is a client of the accounting firm. In one or more embodiments, the connection strength may be a measure of the similarity between the first business entity and the second business entity relative to multiple attributes (e.g., accounting firm, linked account, location, etc.).

In one or more embodiments, a fraud score for the accounting firm is determined, using a cluster analysis. The fraud score for the accounting firm may be a measure of the similarity between the accounting firm and a business entity that is associated with fraudulent behavior. In one or more embodiments, the fraud score may depend on the reason that the business entity is associated with fraudulent behavior. For example, the fraud score may be highest when the business entity has committed fraud in the past, while the fraud score may be lower when the business entity has been a victim of prior fraud.

In Step 206, a probability that the first loan application is fraudulent is determined, based on the connection strength and the fraud score. In one or more embodiments, the probability is based on combining (e.g., multiplying) the connection strength and the fraud score. In one or more embodiments, the connection strength and the fraud score may be assigned numerical values. For example, a value of 0.5 may indicate a weak connection and a value of 1 may indicate a strong connection. Similarly, a value of 0.5 may indicate that the accounting firm was a victim of prior fraud and a value of 1 may indicate that the accounting firm intentionally committed fraud in the past.

The probability that the first loan application is fraudulent may be based on connections between the first business entity and multiple other business entities in the cluster graph. For example, the probability that the first loan application is fraudulent may be based on a sum of a first probability that the first loan application is fraudulent due to a connection with the second business entity, plus a second probability that the first loan application is fraudulent due to a connection with a third business entity.

Figure 3:
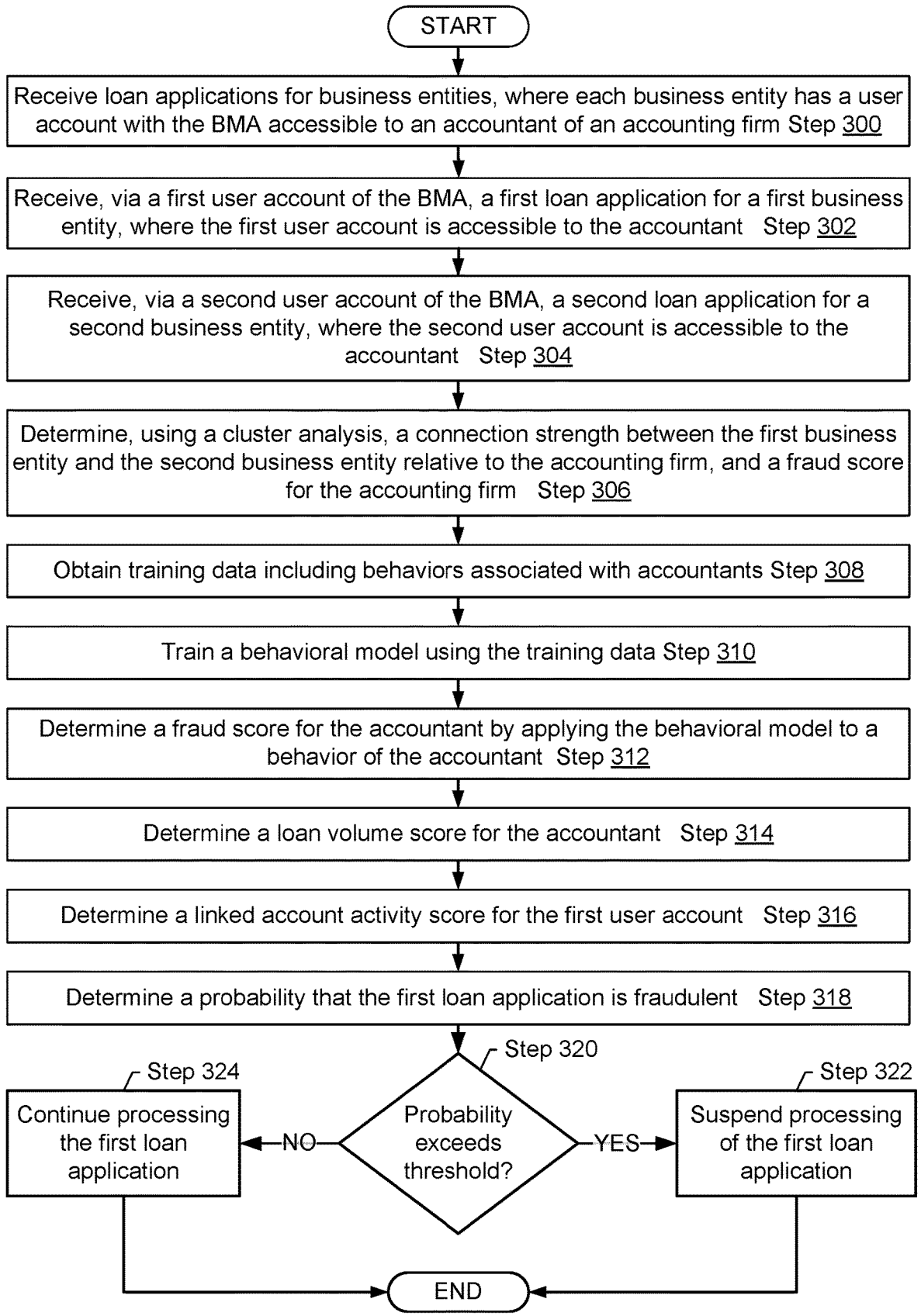

FIG. 3 shows a flowchart in accordance with one or more embodiments of the invention. The flowchart depicts a process for fraud detection. One or more of the steps in FIG. 3 may be performed by the components (e.g., the cluster generator (122) and/or the behavioral modeler (124) of the fraud detector (108)) of the computer system (100), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, loan applications for business entities are received (see description of Step 200 above). Each business entity may have a user account with the BMA that is accessible to an accountant of an accounting firm.

In Step 302, a first loan application for a first business entity is received, via a first user account of the BMA (see description of Step 200 above).

In Step 304, a second loan application for a second business entity is received, via a second user account of the BMA (see description of Step 202 above).

In Step 306, a connection strength between the first business entity and the second business entity relative to the accounting firm is determined, using a cluster analysis (see description of Step 204 above).

In Step 308, training data including behaviors associated with accountants is obtained. In one or more embodiments, the training data may include data on the spending behavior of accountants (e.g., including known fraudulent accountants). For example, the spending behavior may be based on financial transactions associated with accountants obtained from the BMA and/or third party data sources. Training data for other aspects of accountant behavior may be obtained from a variety of data sources (e.g., social media sites). In one or more embodiments, the training data includes product usage data and/or clickstream data relating to the usage of the BMA, where some of the training data is labeled as fraudulent by human observers.

In Step 310, a behavioral model is trained using the training data. The behavioral model may be based on a variety of techniques (e.g., random forests, logistic regression, unsupervised machine learning techniques, etc.). In one or more embodiments, the behavioral model includes representations of behavior relating to a lifestyle of an individual. For example, the behavioral model may represent spending behavior, frequency of vacations, etc.

In one or more embodiments, the behavioral model includes representations of behavior relating to usage of the BMA (e.g., based on clickstream data and/or accounting-related data). For example, a behavioral model of usage behavior may be based on some or all of the following data regarding user accounts of the BMA to which an accountant has access, including: total activity in the user account, timing and frequency of issuing voided checks, changed preferences of the user account, etc.

In Step 312, a fraud score for the accountant is determined by applying the behavioral model to a behavior of the accountant. The behavioral model may be applied to the spending behavior of the accountant. For example, the spending behavior of the accountant may be based on transactions obtained from a user account of the accountant in the BMA, merged with transactions obtained from a personal financial management application of the accountant. In one or more embodiments, the behavioral model may be applied to the usage behavior of the accountant. For example, the usage behavior of the accountant may be based on clickstream data and/or accounting-related data relating to the accountant's usage of the BMA (e.g., via user accounts of the BMA to which the accountant has access). In one or more embodiments, the fraud score for the accountant is a measure of the similarity between the behavior (e.g., spending behavior and/or usage behavior) of the accountant and the behavior of known fraudulent accountants, as represented in the behavioral model.

In Step 314, a loan volume score for the accountant is determined. In one or more embodiments, the loan volume score for the accountant is the number of loan applications where the accountant has access to the user account in the BMA corresponding to the business entity named in the loan application. For example, if the accountant is fraudulent or the accountant's account in the BMA has fallen victim to an account takeover, then fraudulent loan applications may have been submitted for business entities whose user accounts were accessible to the accountant. In one or more embodiments, only those loan applications whose application date is within a predetermined time interval (e.g., within the previous week) of receiving the first loan application (in Step 302 above) are considered when determining the loan volume score.

In Step 316, a linked account activity score for the first user account is determined. In one or more embodiments, the first user account indicates a linked account (e.g., a bank account of the first business entity) from which funds may be withdrawn and/or to which funds may be deposited. The linked account may be an account hosted at a financial institution (e.g., a bank). In one or more embodiments, the linked account activity score is based on the number of changes to the linked account within a predetermined time interval (e.g., within the previous month) of receiving the first loan application in Step 302 above. For example, recently adding or changing the linked account may be correlated with attempts to re-route funds to an account of a fraudster.

The change to the linked account may be: adding or removing the linked account corresponding to the first user account in the BMA. In one or more embodiments, the change to the linked account may be a change to the linked account hosted at the financial institution (e.g., changing an attribute of the linked account at the financial institution, such as the account owner). In one or more embodiments, the financial institution may be queried to obtain a description of any changes to the linked account hosted at the financial institution. For example, the financial institution may be queried at periodic intervals (e.g., each time a user logs into the first user account) regarding any changes to the linked account hosted at the financial institution. As another example, a stream of changes (e.g., in real time) to the linked account hosted at the financial institution may be received from the financial institution.

The linked account activity score for the accountant may be based on the number of user accounts in the BMA sharing the linked account. For example, multiple user accounts (e.g., corresponding to multiple business entities) sharing a linked account may be correlated with fraudulent behavior. The number of user accounts in the BMA sharing the linked account may be obtained by submitting a query to the BMA to request all user accounts associated with the linked account.

In Step 318, a probability that the first loan application is fraudulent is determined. In one or more embodiments, the probability is based on one or more of the following: the connection strength between the first business entity and the second business entity, the fraud score for the accounting firm, the fraud score for the accountant, the loan volume score, and the linked account activity score. In one or more embodiments, the probability is based on combining the aforementioned scores, for example, by assigning a weighting factor to each score. In one or more embodiments, the aforementioned scores may be combined using one or more rules. For example, a rule may be based on a pattern of fraudulent activity recently used by fraudsters. Another rule may be to check whether one of the aforementioned scores has reached an extreme value (e.g., maximum or minimum value). For example, the extreme value may correlate, with high confidence, with a fraudulent loan application. More complicated rules may be generated based on a performance metric associated with one of the aforementioned scores. For example, the performance metric may measure the usefulness (e.g., measured as a degree of correlation) of one of the aforementioned scores relative to detecting fraud in historic data on loan applications.

If, in Step 320, the probability exceeds a pre-determined threshold, then in Step 322 processing of the first loan application is suspended (e.g., pending the outcome of a fraud investigation). In one or more embodiments, if one of the aforementioned scores (e.g., the loan volume score) exceeds a pre-determined threshold, then in Step 322 processing of the first loan application is suspended.

In one or more embodiments, if a user logged into the first user account when the first loan application was received was an accountant (e.g., as indicated in a user login table of the BMA), then in Step 322 processing of the loan application may be suspended. For example, it may be considered highly unusual, if not outright fraudulent, for a user who is an accountant to submit a loan application for a business entity for which the accountant provides services. Similarly, in one or more embodiments, if the first user account and the second user account share a common linked account, then in Step 322 processing of the loan application may be suspended. For example, it may be considered highly unusual, if not outright fraudulent, for multiple business entities to share a common bank account.

Otherwise, if in Step 320, the probability is within the pre-determined threshold, then in Step 324 processing of the first loan application continues.

Figure 4A:
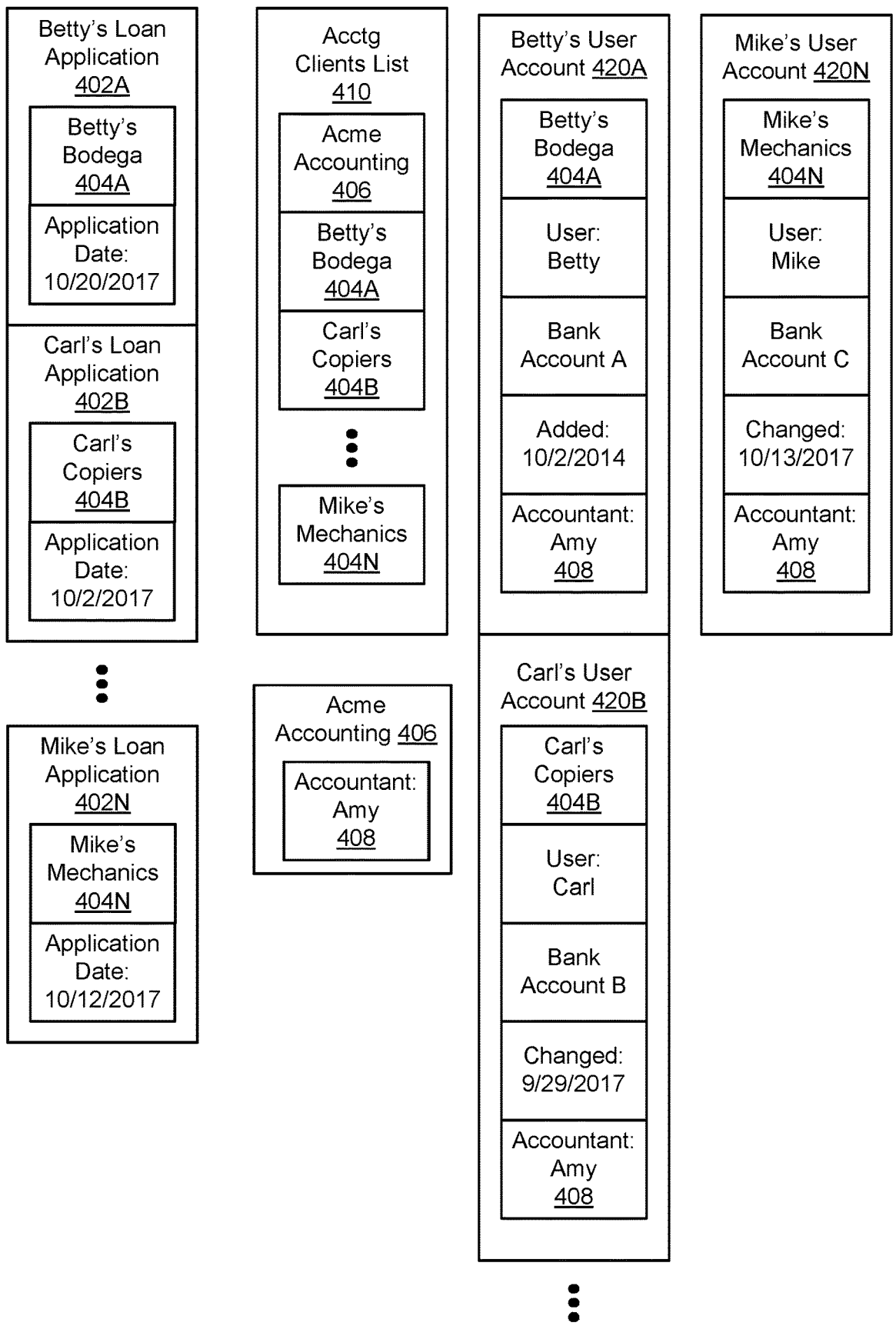
FIG. 4A, FIG. 4B, and FIG. 4C show examples in accordance with one or more embodiments of the invention.
Figure 4B:
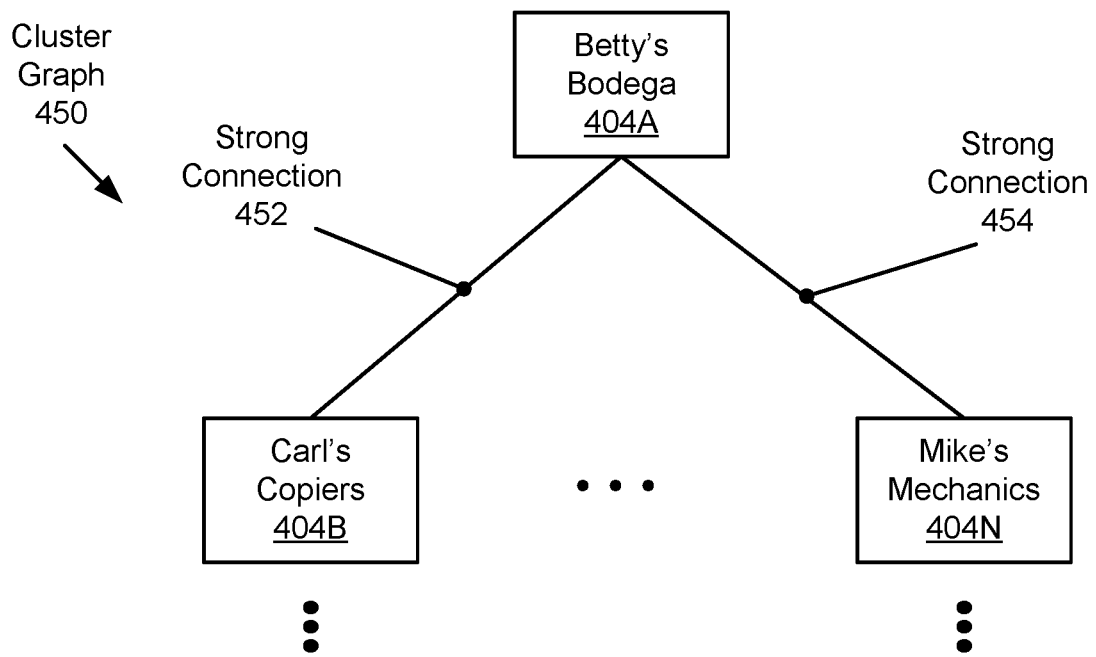
Figure 4C:
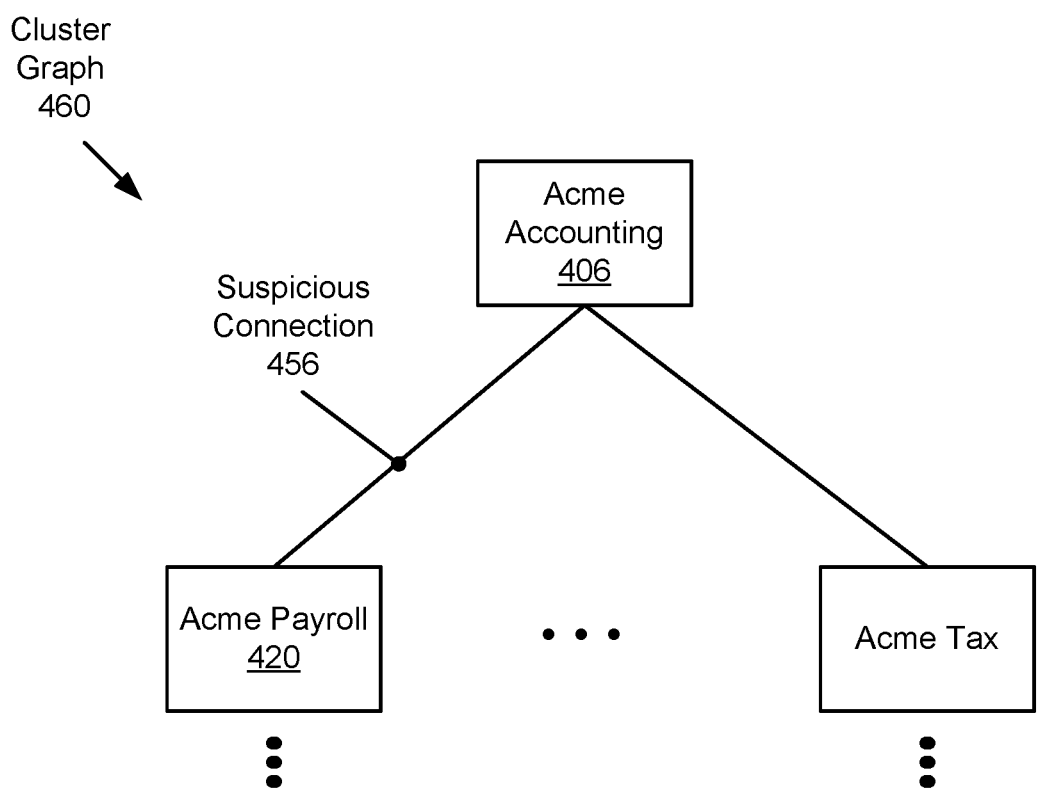

The following example is for explanatory purposes only and not intended to limit the scope of the invention. FIG. 4A, FIG. 4B, and FIG. 4C show an implementation example in accordance with one or more embodiments of the invention.

Initially, the cluster generator ((122) in FIG. 1A)) receives, on Oct. 20, 2017, a loan application (402A) for Betty's Bodega (404A), as illustrated in FIG. 4A. Betty's user account (420A) with the BMA ((106) in FIG. 1A) is accessible to Amy (408), an accountant employed by Acme Accounting (406), an accounting firm hired by Betty's Bodega (404A). The accounting clients list (410) indicates that Betty's Bodega (404A), Carl's Copiers (404B), and Mike's Mechanics (404N) are clients of Acme Accounting (406).

The cluster generator (122) generates a cluster graph (450) for Betty's Bodega (404A) by performing a cluster analysis, as illustrated in FIG. 4B. The cluster graph (450) shows connection strengths (452, 454) between Betty's Bodega (404A) and other business entities (404B, 404N) relative to the attribute "accounting firm". The cluster graph (450) shows that Betty's Bodega (404A) has strong connections (452, 454) to business entities Carl's Copiers (404B) and Mike's Mechanics (404N) due to the shared accounting firm Acme Accounting (406). The cluster generator (122) determines a connection strength of 1 between Betty's Bodega (404A) and both Carl's Copiers (404B) and Mike's Mechanics (404N), based on the strong connections (452, 454). The cluster generator (122) takes the average of the two strong connections (452, 454) and assigns an overall connection strength of 1.

The cluster generator (122) also generates a cluster graph (460) for Acme Accounting (406), as illustrated in FIG. 4C. The cluster generator (122) generates a fraud score for Acme Accounting (406) that measures the similarity relative to several attributes (e.g., EIN, social security number, phone number, name of owner, etc.) between Acme Accounting (406) and business entities known to be associated with fraudulent behavior. The cluster generator (122) applies the following rule for determining the fraud score for an accounting firm: assign a fraud score of 0.7 if the business entity and the accounting firm share one attribute, assign a fraud score of 0.8 if the business entity and the accounting firm share two attributes, and assign a fraud score of 0.9 if the business entity and the accounting firm share three or more attributes. The cluster generator (122) determines a fraud score of 0.7 for Acme Accounting (406) based on identifying a suspicious connection (456) to Acme Payroll (420), a business entity that was the victim of previous fraud, based on a shared phone number.

The cluster generator (122) determines the probability that Betty's loan application (402A) is fraudulent by multiplying the connection strength by the fraud score to obtain a probability of 0.7. In this example, the cluster generator (122) uses a pre-determined threshold probability of 0.5, above which the processing of a loan application is suspended pending a fraud investigation. Therefore, the processing of Betty's loan application (402A) is suspended.

In an alternate scenario, the cluster generator (122) uses additional information to compute the probability that Betty's loan application (402A) is fraudulent. The cluster generator (122) trains a behavioral model using training data for behaviors associated with accountants, including personal spending behavior and usage behavior relative to the BMA (106). The spending behavior is based on financial transactions associated with accountants obtained from the BMA (106), where the median amount spent is $2000/month. The usage behavior is based on clickstream data relating to the usage of the BMA (106) that is labeled as fraudulent. The fraudulent usage behavior includes voiding a check in the week prior to receiving Betty's loan application (402A) and changing a product preference for the BMA (106) in the month prior to receiving Betty's loan application (402A).

The cluster generator (122) applies the behavioral model to the spending behavior and usage behavior of Amy (408), to generate a fraud score for Amy (408). Amy (408) spends, on average, $3500 per month, which represents an outlier relative to the median amount spent. However, Amy (408) has not voided any checks or changed any product preferences for the BMA (106) in the past 6 months. The cluster generator (122) determines a fraud score for Amy (408) of 0.25 based on combining the outlier spending behavior with the non-fraudulent usage behavior of the BMA (106).

The cluster generator (122) also determines a loan volume score for Amy (408). The loan volume score is based on the number of recent loan applications (402B, 402N) for business entities (404B, 404N) related to Amy (408) that were submitted within the past month. The business entities (404B, 404N) are related to Amy (408) because Amy (408) has access to the user accounts (420B, 420N) of the BMA (106) corresponding to the business entities (404B, 404N). The cluster generator (122) applies the following rule for determining the loan volume score: add 0.33 for each recent loan application related to the accountant submitted within the past month, capped at 1. Therefore, the cluster generator (122) assigns a loan volume score of 0.66 for Amy (408).

The cluster generator (122) determines a linked account activity score based on the number of changes to the linked account A (422A) associated with Betty's user account (420A) within the month prior to receiving Betty's loan application (402A). The linked account activity score is zero because Betty's linked account A (422A) has not been modified in over 3 years.

In the alternate scenario, the cluster generator (122) then determines the probability that Betty's loan application (402A) is fraudulent by calculating a weighted sum of the various scores determined above using the following weights based on the relative importance of the various scores (e.g., defined as configuration parameters of the cluster generator (122)):

probability of fraud based on the connection strength and the fraud score for the accounting firm (calculated above): 0.5 fraud score for the accountant: 0.1 loan volume score: 0.3 linked account activity score: 0.1

Therefore, the probability that Betty's loan application (402A) is fraudulent is 0.5(0.7)+0.1(0.25)+0.3(0.66)+0.1(0) =0.35+0.025+0.2=0.575. In the alternate scenario, the cluster generator (122) uses a pre-determined threshold probability of 0.5, above which the processing of a loan application is suspended. Therefore, the processing of Betty's loan application (402A) is also suspended in the alternate scenario.

Figure 5A:
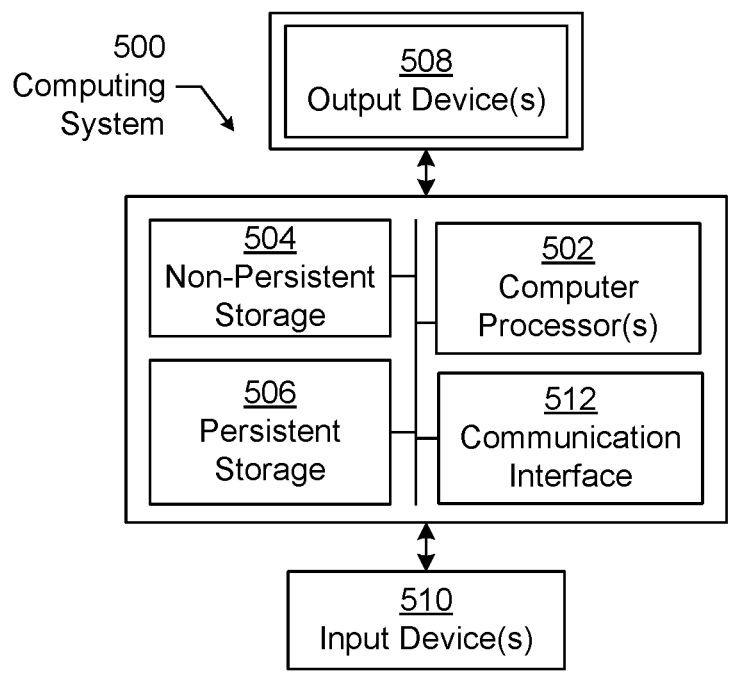
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
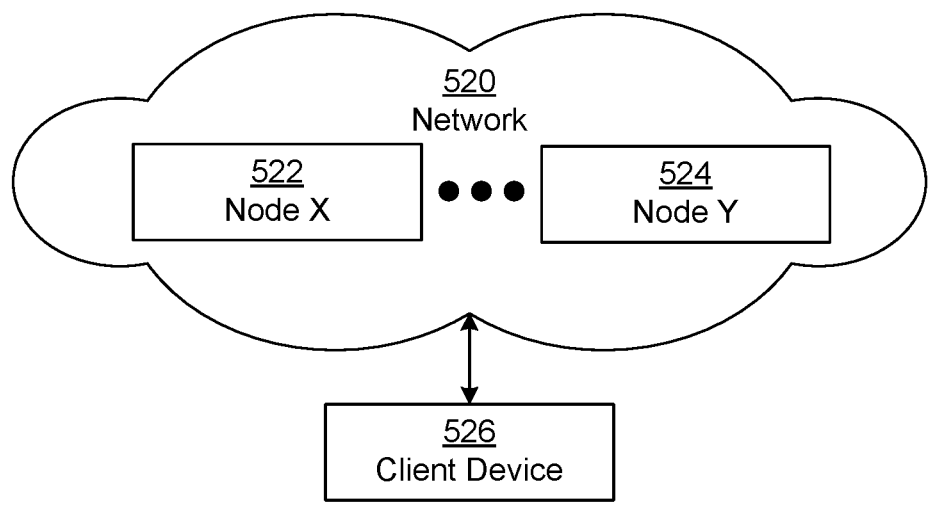

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for fraud detection, comprising:
    receiving, via a first user account of a business management application (BMA), a first electronic loan application for a first business entity, wherein the first user account is electronically accessible to an accountant of an accounting firm;
    receiving, via a second user account of the BMA, a second electronic loan application for a second business entity, wherein the second user account is electronically accessible to the accountant;
    training a behavior machine learning model using training data, the training data comprising spending behavior of accountants electronically accessing the BMA combined with BMA usage data as well as data from electronic social media Web sites;
    providing the first electronic loan application and the second electronic loan application to the behavior machine learning model;
    determining, by the behavior machine learning model applying a cluster analysis, at least both of (i) a connection strength between the first business entity and the second business entity relative to the accounting firm, and (ii) a fraud score for the accounting firm, wherein the fraud score is a measure of similarity between the accounting firm and a business entity that is associated with fraudulent behavior;
    determining, by the behavior machine learning model and based on the connection strength and the fraud score, a probability that the first loan application is fraudulent; and
    suspending electronic processing of the first electronic loan application responsive to the probability exceeding a pre-determined threshold.

2. The method of claim 1, further comprising:
    obtaining training data comprising behaviors associated with accountants;
    training a behavioral model using the training data; and
    determining a fraud score for the accountant by applying the behavioral model to a behavior of the accountant,
    wherein determining the probability that the first loan electronic application is fraudulent is further based on the fraud score for the accountant.

3. The method of claim 2, wherein the behaviors comprise (i) spending behaviors, and (ii) usage behaviors each relating to a usage of the BMA.

4. The method of claim 2, wherein the behavioral model is a classifier based on one selected from a group consisting of logistic regression and random forests.

5. The method of claim 1, further comprising:
    receiving, prior to receiving the first loan electronic application, electronic loan applications for business entities, each business entity having a user account with the BMA accessible to an accountant of the accounting firm; and
    determining a loan volume score for the accountant based on receiving the electronic loan applications,
    wherein the electronic loan applications were received within a pre-determined time interval of receiving the first electronic loan application, and
    wherein determining the probability that the first electronic loan application is fraudulent is further based on the loan volume score.

6. The method of claim 1, further comprising:
    obtaining, from the BMA, a linked account of the first user account; and
    determining a linked account activity score for the first user account based on a date when the linked account was last changed, wherein determining the probability that the first electronic loan application is fraudulent is further based on the linked account activity score.

7. The method of claim 1, further comprising:
    automatically, by command of a processor, suspending processing of the first electronic loan application in response to determining the probability that the first electronic loan application is fraudulent.

8. A system, comprising:
    a computer processor;
    a repository configured to store a first electronic loan application and a second electronic loan application;
    a business management application (BMA) executing on the computer processor comprising a plurality of user accounts;
    a fraud detector executing on the computer processor comprising a cluster generator configured to:
        train a behavior machine learning model using training data, the training data comprising spending behavior of accountants electronically accessing the BMA combined with BMA usage data as well as data from electronic social media Web sites;
        receive, via a first user account of the plurality of user accounts and at the behavior machine learning model, the first electronic loan application for a first business entity, wherein the first user account is electronically accessible to an accountant of an accounting firm;
        receive, via a second user account of the plurality of user accounts and at the behavior machine learning model, the second electronic loan application for a second business entity, wherein the second user account is electronically accessible to the accountant;
        determine, by the behavior machine learning model applying a cluster analysis, at least both of (i) a connection strength between the first business entity and the second business entity relative to the accounting firm, and (ii) a fraud score for the accounting firm, wherein the fraud score is a measure of similarity between the accounting firm and a business entity that is associated with fraudulent behavior;
        determine, by the behavior machine learning model and based on the connection strength and the fraud score, a probability that the first loan application is fraudulent; and
        suspend electronic processing of the first electronic loan application responsive to the probability exceeding a pre-determined threshold.

9. The system of claim 8, wherein the fraud detector further comprises a behavioral modeler configured to:
    obtain training data comprising behaviors associated with accountants;
    train a behavioral model using the training data; and
    determine a fraud score for the accountant by applying the behavioral model to a behavior of the accountant,
    wherein determining the probability that the first electronic loan application is fraudulent is further based on the fraud score for the accountant.

10. The system of claim 9, wherein the behaviors comprise (i) spending behaviors, and (ii) usage behaviors each relating to a usage of the BMA.

11. The system of claim 9, wherein the behavioral model is a classifier based on one selected from a group consisting of logistic regression and random forests.

12. The system of claim 8, wherein the cluster generator is further configured to:
    receive, prior to receiving the first electronic loan application, electronic loan applications for business entities, each business entity having a user account with the BMA accessible to an accountant of the accounting firm; and
    determine a loan volume score for the accountant based on receiving the electronic loan applications,
    wherein the electronic loan applications were received within a pre-determined time interval of receiving the first electronic loan application, and
    wherein determining the probability that the first electronic loan application is fraudulent is further based on the loan volume score.

13. The system of claim 8, wherein the cluster generator is further configured to:
    obtain, from the BMA, a linked account of the first user account; and
    determine a linked account activity score for the first user account based on a date when the linked account was last changed, wherein determining the probability that the first electronic loan application is fraudulent is further based on the linked account activity score.

14. The system of claim 8, wherein the cluster generator is further configured to:
    suspend processing of the first electronic loan application in response to determining the probability that the first electronic loan application is fraudulent.

15. A non-transitory computer readable medium comprising instructions that, when executed by a processor, perform a method for fraud detection, comprising:
    receiving, via a first user account of a business management application (BMA), a first electronic loan application for a first business entity, wherein the first user account is electronically accessible to an accountant of an accounting firm;
    receiving, via a second user account of the BMA, a second electronic loan application for a second business entity, wherein the second user account is electronically accessible to the accountant;
    training a behavior machine learning model using training data, the training data comprising spending behavior of accountants electronically accessing the BMA combined with BMA usage data as well as data from electronic social media Web sites;
    providing the first electronic loan application and the second electronic loan application to the behavior machine learning model;
    determining, by the behavior machine learning model applying a cluster analysis, at least both of (i) a connection strength between the first business entity and the second business entity relative to the accounting firm, and (ii) a fraud score for the accounting firm, wherein the fraud score is a measure of similarity between the accounting firm and a business entity that is associated with fraudulent behavior;
    determining, by the behavior machine learning model and based on the connection strength and the fraud score, a probability that the first loan application is fraudulent; and
    suspending electronic processing of the first electronic loan application responsive to the probability exceeding a pre-determined threshold.

16. The non-transitory computer readable medium of claim 15, wherein the method further comprises:
    obtaining training data comprising a set of behaviors associated with accountants;
    training a behavioral model using the training data; and
    determining a fraud score for the accountant by applying the behavioral model to a behavior of the accountant,
    wherein determining the probability that the first electronic loan application is fraudulent is further based on the fraud score for the accountant.

17. The non-transitory computer readable medium of claim 15, wherein the method further comprises:
    receiving, prior to receiving the first electronic loan application, electronic loan applications for business entities, each business entity having a user account with the BMA accessible to an accountant of the accounting firm; and
    determining a loan volume score for the accountant based on receiving the electronic loan applications,
    wherein the electronic loan applications were received within a pre-determined time interval of receiving the first electronic loan application, and
    wherein determining the probability that the first electronic loan application is fraudulent is further based on the loan volume score.

18. The non-transitory computer readable medium of claim 15, wherein the method further comprises:
    obtaining, from the BMA, a linked account of the first user account; and
    determining a linked account activity score for the first user account based on a date when the linked account was last changed, wherein determining the probability that the first electronic loan application is fraudulent is further based on the linked account activity score.

19. The non-transitory computer readable medium of claim 15, wherein the method further comprises:
    suspending processing of the first electronic loan application in response to determining the probability that the first loan application is fraudulent.

* * * * *